FIG. I.

INVENTOR.
G.A. KIRK

INVENTOR.
G. A. KIRK
BY
HIS ATTORNEY

United States Patent Office 3,249,803
Patented May 3, 1966

---

3,249,803
ELECTRONIC POWER CONTROL APPARATUS EMPLOYING CAPACITRON TYPE TUBES
George A. Kirk, Teaneck, N.J., assignor to General Signal Corporation, a corporation of New York
Filed July 7, 1961, Ser. No. 122,546
17 Claims. (Cl. 315—168)

The present invention relates to a method, apparatus, and system for controlling the switching times of high currents, and more particularly to a system for precisely controlling the conduction time of high amperage currents during one or more half cycles of line voltage. In one specific aspect, the present invention relates to an improved mercury pool discharge tube, and method and system for causing it to fire.

Heretofore, it was common practice to use conventional thyratron tubes to control precisely the time and duration of firing of high current switching devices during each half cycle of power line voltage. For example, in conventional electronic control circuits, such as are used for resistance welding, the welding transformer is connected to its source through two pool type mercury vapor tubes, of the type commonly known as ignitrons. These ignitrons are connected in a well known circuit to fire during alternate half cycles of line voltage and controlled to fire anywhere from a small fraction of a half cycle up to sixty half cycles in accordance with the desired duration and intensity of the weld. The thyratrons in the circuit start conducting when a positive voltage is applied to their grids and they continue to fire during the respective half-cycle until plate voltage reaches extinction, which is usually in the neighborhood of ten volts. The cathodes of thyratrons are so connected to provide the power when they are fired to start ignition of the ignitrons.

However, there are certain disadvantages in using thyratrons for switching high currents. For example, the life of the cathode of a thyratron tube is finite and they have limited peak current availability. Also, it is necessary to wait a predetermined period of time for the filament to heat up before an anode voltage may be applied. Moreover, the rated average current of a thyratron may be exceeded by the failure of the ignitrons to conduct, such as may be caused by an open circuit or "wetting" of the ignitron, for example. Furthermore, it is not practicable to install thyratron tubes in the same mounting cabinet with solid state devices because the heat of the thyratrons conducts throughout the cabinet causing the destruction or malfunction of the solid state devices.

In an attempt to overcome the disadvantages in the use of thyratron tubes in this type of circuit, a circuit using silicon controlled transistor rectifiers is sometimes employed. However, silicon controlled rectifiers are vulnerable in that if the voltage or current is exceeded momentarily, they fail in a catastrophic manner, which requires the installation of expensive protective devices to prevent such an occurrence. Also, in order to obtain the peak power requirements, it is necessary to connect a plurality of these transistors in parallel in the circuit.

Heretofore, it has also been proposed to use gated field emission rectifier tubes of the mercury pool type, and commonly known as capacitrons, to control the switching of the high currents, which may be used in place of the thyratrons. These gated field emission rectifiers or capacitrons are comprised of a mercury pool cathode and an anode, with the firing voltage being applied externally of the glass tube envelope to a metallic strip mounted around the outside of the glass envelope of the tube. Tubes of this type are desirable in that there is no vulnerable cathode to be destroyed, and they have practically unlimited peak current capabilities. However, heretofore, their use was impractical because it was found that they would become "wet" with mercury after being in service a short time, which caused them to fire inconsistently and otherwise malfunction; or in many cases the glass envelope would rupture. Even the most painstaking and elaborate treatment in the construction of this type of tube did not cure or overcome these inherent defects, and malfunction occurred after a short period of time.

The purpose of the present invention is to provide an improved gated field emission rectifier tube of the capacitron type and method and system for firing it, which overcomes the inherent disadvantages in the use of thyratron tubes and silicon controlled rectifiers, and yet, is reliable in its operation over a long period of time without failure or malfunction. In furtherance thereof, One of the objects of this invention is to provide an improved system for controlling the switching of high power requirements.

Another object of the present invention is to provide an improved method and system for controlling the operation of an improved gated field emission rectifier of the capacitron type.

Another object of this invention is to provide an improved mercury pool type tube of the capacitron type, and a method and system of causing the firing thereof.

A further object of this invention is to provide an improved tube of the character described and method and system of controlling its firing wherein the tube may be operated reliably and without "wetting," for an indefinite period of time.

A still further object of this invention is to provide an improved transistorized system for causing high voltage field emission in an improved tube of the type commonly referred to as a capacitron.

A still further object of this invention is to provide an improved tube of the mercury pool type which does not require semiconductor igniters, "keep alive" electrodes, grid assemblies, and high starting peak power. Also, precise control of the starting characteristics is obtained even in the milliampere anode current regions.

A still further object of this invention is to provide an improved tube of the capacitron type and system of operation wherein the tube is reliable in its operation, may be simple in its fabrication, and relatively inexpensive to manufacture.

Other objects of this invention will become apparent from the specification, the drawings, and the appended claims.

To illustrate the principles of the present invention, and by way of example they will be described in connection with a control circuit for resistance welding where the need for accurately controlling the average current and the duration of the weld is of paramount importance. The average current in this type of control circuit is determined by varying the phase of the firing signal with respect to the line voltage. The duration of the weld may be controlled by supplying the current for a predetermined number of half cycles of line voltage in accordance with the requirements of practice. The circuits for controlling the times of starting during the half cycles of line voltage and the duration of the firing through a predetermined number of half cycles are not shown as they are well known in the art and form no part of the present invention.

Generally speaking and without limiting the scope of the invention, an improved mercury pool tube of the capacitron type according to the present invention may be fired by the application of a voltage pulse, which is in the neighborhood of 100 microseconds in duration and the peak voltage of each pulse is at least seven kilovolts. In actual practice ten kilovolts have been found practical. It has been found that a single pulse of longer duration than 100 microseconds or a plurality of pulses in excess of three or more causes the tube to wet with mercury in a short period of time, such as four hours, for example, thereby resulting in failure of the tube. To insure efficient operation of the tube without "wetting" two pulses of 100 microseconds has been found practical. The application of pulses of shorter duration are found to be insufficient to ionize the mercury for firing the tube. These one hundred microsecond pulses are applied during the appropriate half cycle in accordance with the average current required to produce the weld.

Also, in accordance with the present invention, the improved tube which is effectively thus operated is comprised of a glass envelope which is acid cleaned and contains a mercury pool cathode and a spaced anode. The firing means is comprised of an annular band or ring of semi-conductive material that is applied to the external surface of the glass envelope of the tube to extend above and below the top surface or the meniscus of the mercury pool. The application of high voltage pulses to this semi-conductive ring, which may be painted on the envelope causes the tube to fire for the remainder of each half cycle that the pulses are applied or until the tube is extinguished in accordance with the circuit. The outside of the tube envelope and the ring of semi-conductive material is coated with a silicon grease, and then a plastic cylinder is fit over the tube and sealed at both ends to hermetically enclose the glass envelope of the tube therein.

Figure 1:
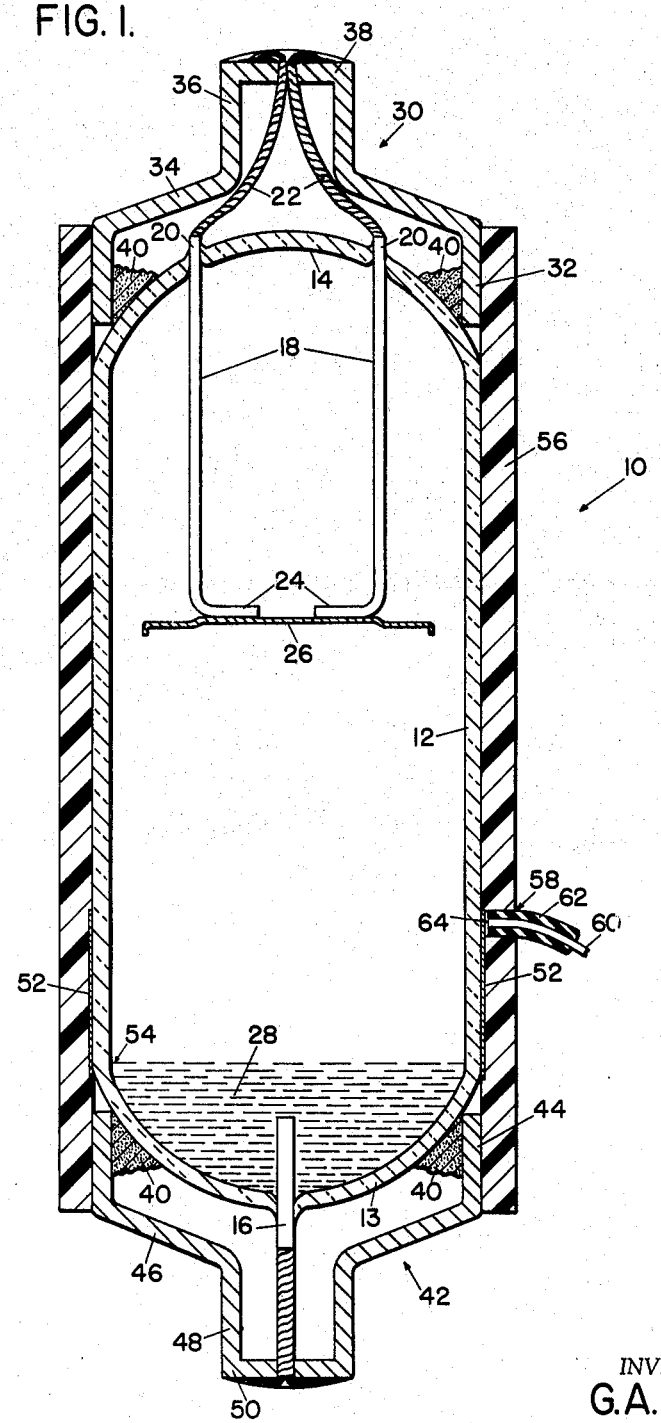
FIG. 1 is a longitudinal sectional view of a tube structure according to one embodiment of the invention.

Referring to FIG. 1, a tube according to the present invention is generally referred to at 10. This tube 10 is comprised of a cylindrical glass envelope 12 that has integrally formed generally hemispherical opposite ends 13 and 14 to close the interior of the tube 10. A metallic rod 16, which is a cathode conductor extends interiorly and exteriorly of the glass envelope 12 through the curved end portion 13 and the glass at this end portion is fused around the rod 16 to effectively support it therein and seal off this end of the envelope. A pair of spaced conducting rods 18 are supported by the envelope 12 at the curve portion 14 thereof and extend inwardly into the envelope 12 for a portion of its length. The rods 18 are sealed in the portion 14 of the glass envelope 12 as by fusing and have upper ends 20 which communicate exteriorly of the envelope 12. A pair of conductors 22 are attached to the external ends 20 of the rods 18. The rods 18 each have a lower bent portion 24 to which an anode 26 is attached as by welding for example. The anode 26 is preferably tantalum but may be any metal such as iron or nickel, and where heat may be a factor it may be made of carbon.

A pool of mercury 28 is contained in the envelope 12 in sufficient quantity so that when the tube is in its upright position as shown in FIG. 1 the mercury immerses completely that portion of the rod 16 in the envelope 12.

A metallic end cap 30 is affixed over the end 14 of the envelope 12. This end cap 30 may be formed from a single piece of sheet metal, and has a cylindrical portion 32, the outside diameter of which is substantially equal to the outside diameter of the envelope 12. The cap 30 has portion 34 which extends inwardly from the cylindrical portion 32 and is bent outwardly to provide a central projecting portion 36 of small diameter. The anode conductors 22 are electrically secured to a top portion 38 of the cap 30. The curve portion 13 of the envelope 12, also has a metallic cap 42 which is similar to the cap 30 and has a cylindrical portion 44 and inwardly converging portion 46 and a smaller cylindrical projection 48. The cathode connection 16 is affixed to a top portion 50 of the cap 42. The caps 30 and 42 are securely attached to the glass envelope 12 by an adhesive substance 40, which may be epoxy, for example. The tube 10 is mounted so that the cap 42 is the lower end of the tube and the cap 30 is the upper end. An external anode connection may be made by attachment to the central projecting portion 36 of the cap 30 and a cathode connection may be made by attachment to the projection of the cap 42.

A semi-conductive material, referred to at 52, which may be a compound or a colloidal suspension that includes carbon particles, such as aquadag, for example, is painted around the glass envelope 12 to form a ring of semi-conductive material opposite the top surface or meniscus of the mercury pool 28 which is referred to at 54. Aquadag has been found practical because it is inexpensive and offers approximately one thousand ohms of resistance per linear inch when the ring 52 is ¼ of an inch wide. In one practical application, the outside circumference of the envelope 12 was 4½ inches and the ring of aquadag was approximately ¼ inch wide. This offered approximately 2000 ohms of resistance between diametrically opposite points on the ring. It has been found that if a wire ring of material, such as copper or silver, for example, is used, the tube will eventually become "wet."

The exterior surface of the envelope 12 is coated with a silicon grease which has high dielectric qualities. The silicon grease prevents the surface resistance of the envelope 12 from decreasing to a point where the tube misfires when atmosphere conditions are such that the relative humidity is over 85%. A sleeve or tube 56 of plastic, such as polystyrene is slidably fit over the coated exterior surface of the envelope 12 and is of such a length that the outer peripheral surfaces of the portions 32 and 44 of the caps 30 and 42 respectively engage in sealing relationship the inner surfaces of the tube 56 adjacent its opposite ends. The sleeve 56 may be securely fastened to the peripheral surface of the portions 32 and 44 in a conventional manner to hermetically seal the glass envelope 12 of the tube.

The sleeve 56 prevents misfiring of the tube 10 due to dust and moisture condensation or other foreign matter which might collect on the exterior surface of the envelope 12. The collection of this foreign matter provides a leakage path between the anode and cathode causing the cathode to load down the circuit with the result that firing ceases.

The polystyrene tube or sleeve 56 is provided with an opening 58 into which is inserted a conductor 60 that is covered by suitable insulation 62. This conductor or wire 60 is securely attached to be in electrical contact with the painted ring of aquadag 52. This may be done by soldering the end of the wire 60 to a small metal tab 64 that is thereafter cemented to the ring 52 with an epoxy adhesive.

In constructing a tube 10 according to the present invention, a bora silicate glass envelope 12 commonly known as Nonex is acid cleaned and then a tungsten or nickel cathode connector 16 is inserted through the one end, the anode rods 18 are sealed in the envelope 12 to position the anode 26 therein.

A suspension, commonly known as aquadag is applied around the outside of the envelope 12 and let dry to form the ring 52. The envelope 12 is then evacuated in a conventional manner, with the mercury being inserted therein to form the pool 28 either before or after evacuation. The anode plate 26 is then "bombed" inductively while on the evacuator, and then the envelope is sealed off. After removing from the evacuator, the connectors 16 and 22 are fastened to their respective end caps 30 and 42 and the end caps are cemented in place. The outer surface of the envelope 12 is then coated with silicon grease and the sleeve 56 cemented in position. The wire 60 having the tab 64 attached is inserted through the opening 58 in the sleeve 56 and cemented in place.

Figure 2:
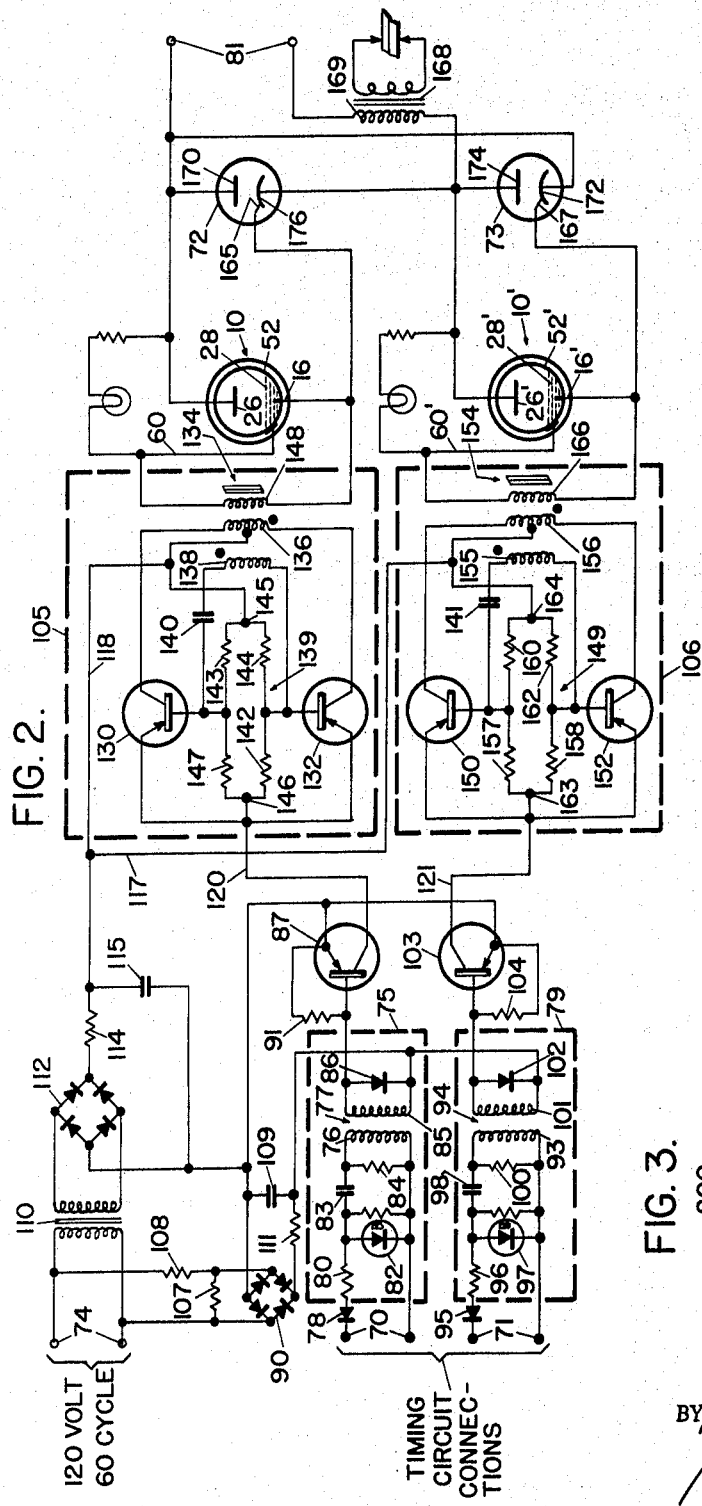
FIG. 2 is a schematic diagram of the circuitry and apparatus for controlling the operation of a tube according to this embodiment of the invention in an arrangement which may be used for resistance welding.

Referring to the circuit diagram of FIG. 2, a portion of a resistance welding circuit is shown by way of example embodying the present invention. The outputs of a conventional timing circuit may be operatively connected across terminals 70 and 71 to provide the input control signal for firing ignitrons 72 and 73 at the proper time during a respective half cycle of the sixty cycle line voltage. A power supply voltage source which is 120 volts of 60 cycles is connected across terminals 74. The power of this supply voltage is in the order of five watts. The line voltage, which may be anywhere from 220 to 560 volts at sixty cycles, for example, is adapted to be connected across the terminals 81. The length of time that the ignitrons 72 and 73 are fired during a predetermined number of these half cycles of the line voltage is determined by the length of time that the timing signal is applied to the terminals 70 and the terminals 71. A timing signal synchronous with the line voltage that is applied to the terminals 70 controls the firing of the ignitron 72 during one half cycle of the line voltage and a synchronous signal applied to the terminals 71 controls the firing of the ignitron 73 in the subsequent half cycle.

The terminals 70 are input terminals to a pulse shaper 75 and the terminals 71 are the input terminals to a pulse shaper 79. The terminals 70 are connected to opposite sides of primary winding 76 of an impedance matching transformer 77. Inserted in the wire connected to one side of winding 76 is a diode 78 which eliminates any positive going pulses that are applied to the terminals 70 from the timing circuit. In series with the diode 78 is a resistor 80 which limits the energy to a zener diode clipper 82, which is connected across the primary winding 76. A capacitor 83 is inserted in series with the resistor 80 and the one side of the winding 76, and a resistor 84 that is connected across the winding 76 serve to create a time constant for differentiating the control signal applied to terminals 70. The voltage of the control signal is stepped down to approximately one and one-half volts by the secondary winding 85. The positive going voltage pulses across the winding 85 are shorted out by a diode 86 which is connected across the secondary winding. A PNP transistor 87 is connected by its base to one side of the winding 85 of the transformer 77; and the other side of the winding 85 is connected to one diagonal of a full wave rectifier 90. The emitter of the transistor 87 is connected through a resistor 91 to the base of the transistor 87 and is also connected to the opposite diagonal of the full wave rectifier 90.

The terminals 71 are connected across a primary winding 93 of an impedance matching transformer 94 similar to the transformer 77. Inserted in the wire connected to the one side of the primary winding 93 is a diode 95 which eliminates any positive going pulses in the control signal applied to the terminals 71. A resistor 96 limits the energy to a zener diode clipper 97, which is connected across the primary winding 93. Also, a capacitor 98 and a resistor 100 is provided in this primary circuit to differentiate the incoming control signal. The transformer 94 has a step-down secondary winding 101 which provides approximately a one and one-half volt output, and has a diode 102 connected across the secondary winding 101 to eliminate any positive going signal. A transistor 103 is connected by its base to one side of the secondary winding 101; and the other side of the winding 101 is connected to one diagonal of the rectifier 90 in common with the one side of the secondary winding 85. The emitter of the transistor 103 is connected through a resistor 104 to the base circuit; and is also connected in common with the emitter of the transistor 87 to the opposite diagonal of the rectifier 90.

The pulse shapers 75 and 79 will accept an incoming signal such as a sine wave for example, which is displaced in phase with reference to the line voltage at terminals 81. For example, in the shaper 75 the signal is rectified by the diode 78 and clipped by zener diode 82. Resistor 84 removes any negative on the capacitor 83 due to rectifying action of diode 78. Capacitor 83 and resistor 84 form a differentiating circuit whose time constant is 200 microseconds. This 200 microsecond differential pulse is induced in the secondary winding 85 of transformer 77.

Thus, a control signal of negative value is applied to the base emitter circuit of the transistor 87 during one-half cycle, and a negative control signal is applied to the base emitter circuit of the transistor 103 during the alternate half cycles. Because of the operation of pulse shapers 75 and 79, the signal is applied for 200 microseconds during each respective half cycle. The transistors 87 and 103 operate as switching transistors for controlling high frequency oscillators 105 and 106 respectively as described hereinafter.

The bridge circuit 90 is connected through its opposite diagonals or input connections across the power source applied to the terminals 74. A resistor 107 is connected across the input diagonals of the bridge circuit 90, and a resistor 108 is connected in the wire connected to one of these input diagonals to reduce the incoming voltage to approximately 10 volts. The bridge circuit 90 provides a positive voltage output which is filtered by a network comprised of a capacitor 109 and a resistor 111. Resistor 111 together with resistor 104 and 91 respectively acts as a voltage divider to reduce the output from the capacitor 109 to approximately two tenths of a volt to back bias the transistors 87 and 103 which prevent the transistors from inadvertently conducting, if they should reach a temperature of up to seventy degrees centigrade.

A transformer 110 steps down the 120 volt supply source to approximately 25 volts which is rectified by full wave rectifier 112. The output diagonals of the rectifier 112, which include a resistor 114 and a capacitor 115, forming a filter network is connected to the emitters of both the transistors 87 and 103. Also, wires 117 and 118 connect one output diagonal of the bridge 112 to the oscillators 106 and 105 respectively. The return of the rectified power supply from the bridge 112 is normally open due to non-conduction of the transistors 87 and 103. When transistors 87 and 103 conduct in response to a negative input signal at their base, the collector terminals complete the circuit over wires 120 and 121 to the oscillators 105 and 106 respectively.

Thus, the transistors 87 and 103 are normally cut off, and when a negative pulse is applied, these transistors conduct to apply energy over their wires 120 and 121 for approximately 200 microseconds.

The oscillator 105 is comprised of transistors 130 and 132 of the PNP type. The emitters of the transistors 130 and 132 are commonly connected to the wire 120 from the collector terminal of the switching transistor 87. A saturable core transformer 134 has a center tap winding 136, one side of which is connected to the collector terminal of the transistor 130 and the other side of which is connected to the collector terminal of the transistor 132. The transformer 134 also has a feedback winding 138, one side of which is connected to the base of the transistor 130 through a capacitor 140, and the other side of which is connected to the base of transistor 132. A bridge circuit 139 made up of resistors 147, 142, 143 and 144, respectively, have opposite diagonals which are connected to the base of each of the transistors 130 and 132 in multiple with the feedback winding 138. The D.C. voltage on wire 118 is applied to the center tap of the winding 136 and also to a diagonal of the bridge circuit 139 at terminal 145. The diagonal of the bridge circuit 139 opposite the terminal 145 is connected to the collector of the transistor 87 at terminal 146. The transformer 134 also has a step up winding 148 which increases the voltage approximately five hundred times, for example.

The oscillator 106 is similar to the oscillator 105 and is comprised of PNP transistors 150 and 152. The transistors 150 and 152 have a commonly connected emitter circuit which is connected to the collector of the transistor 103 over the wire 121. A saturable core transformer 154 has a feedback winding 155, opposite ends of which are connected to the bases of the transistors 150 and 152 respectively. Also, similar to the oscillator 105, the collector terminals of the transistors 150 and 152 are connected to opposite sides of a center tap winding 156 of the transformer 154. A bridge circuit 149 which is comprised of resistors 157, 158, 160 and 162 have opposite diagonals which are commonly connected to the bases of the transistors 150 and 152 and opposite sides of the winding 155. The input to the oscillator 106 is over the wire 121 which is connected to a diagonal of the bridge circuit at terminal 163. Also, the direct current power supply is applied over wire 117 to the center tap of the winding 156 and a diagonal of the bridge circuit at terminal 164.

The operation of the oscillator 105 is controlled by the output from the transistor 87 that serves to switch on and off in alternate fashion the transistors 130 and 132. Assuming that the transistor 130 is conducting and transistor 132 is cut off, the D.C. voltage supply on wire 118 is connected across the top half of the center tap winding 136 and induces a voltage in all of the windings of the transformer 134. When the transistor 130 starts to conduct, the voltages and currents in the windings 136, 138 and 148 assume a maximum level. This condition continues to exist until the core of the transformer 134 saturates. When it saturates the rate of change of flux will drop to zero. The induced voltages during the conduction of the transistor 130 decrease in value fast and then become zero, which decreases and then removes the base drive to the transistor 130 that is induced in the feedback winding 138. The current now begins to decrease and causes the flux to build up in the opposite direction. Thus a voltage of opposite polarity is induced in the windings and the transistor 132 starts to conduct. The cycle continues to repeat as long as a signal is present on the wire 120. Although, the oscillator 105 behaves in a square wave fashion, the high voltage output approaches a sine wave because of inductance, lead, tube capacitance, and extremely light loading.

The oscillator 106 operates in a similar manner to the oscillator 105 with its transistors 150 and 152 operating as switches to produce the required oscillations in the transformer 154.

The emitter and collector circuit of the transistors 87 and 103 are each connected in series with its respective oscillator 105 and 106. On command from a negative signal applied to the bases of these transistors 87 and 103, power is applied to the oscillator over the wires 120 and 121.

The transistors in the oscillators 105 and 106 oscillate at approximately a ten kilocycle rate which is controlled by the size of the capacitor 140, for the oscillator 105, and capacitor 141 for the oscillator 106, and also by the watt second storage characteristics of the respective cores of the transformers 134 and 154 while the command pulses of 200 microseconds are present. This applies high voltage bursts to wires 60 and 60' connected to the rings of semiconductive material of the tubes 10 and 10' respectively.

The tubes 10 and 10' are identical to each other in construction and to tube 10 shown in FIG. 1 with the various parts of the tube bearing similar reference characters as that illustrated. The primed numbers of tube 10' bear corresponding reference characters to the tube 10.

The ignitrons 72 and 73 are fired during alternate half cycles of line voltage that is applied to the terminals 81 only during those times when the tubes 10 and 10' are conducting as caused by the oscillators 105 and 106 respectively. The anode 26 of the tube 10 is connected to one terminal of the line voltage 81 and the anode 26' of the tube 10' is connected to the other terminal through primary winding 169 of a welding transformer 168.

The cathode connection 16 of the tube 10 is connected to one side of the step up winding 148 of the transformer 134 and to a firing electrode 165 of the ignitron 72. The cathode connection 16' of the tube 10' is connected to one side of a step up winding 166 of the transformer 154 and also to a firing electrode 167 of the ignitron 73. As previously mentioned the aquadag ring 52 of the tube 10 is connected to the opposite side of the winding 148; and the aquadag ring 52' of the tube 10' is connected to the opposite side of the winding 166. The ignitron 72 has an anode 170 which is connected to one of the terminals 81 in common with a cathode 172 of the ignitron 73. Ignitron 73 has an anode 174 which is connected directly to the other terminal 81 of the line source through the primary winding 169, and is also connected to a cathode 176 of the ignitron 72. Moreover, since the tubes 10 and 10' will fire only by the application of positive pulses applied to the wires 60 and 60', and the tubes 10 and 10' will fire only when their anode is positive with respect to the cathode, it is apparent that in alternate half cycles they will complete a circuit to fire the ignitrons 72 and 73, respectively. This circuit for tube 10 extends from one terminal 81 of the line voltage through the anode 26, the cathode connection 16, and the firing electrode 165 of the tube 72. Similarly, when the tube 10' fires a circuit is completed from the other terminal 81 through the winding 169 of the transformer 168, the anode 26', and the cathode connection 16' to the firing electrode 167 of the ignitron 73.

Figure 3:
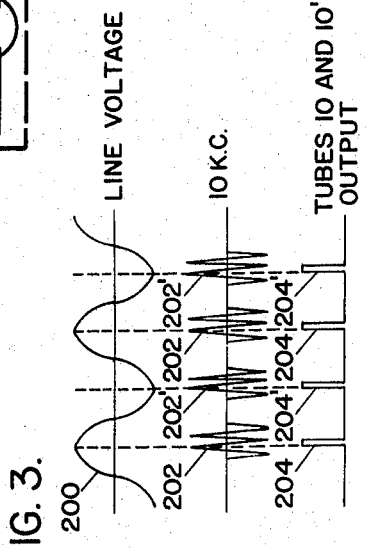
FIG. 3 illustrates the voltage waveforms in various parts of the circuit of FIG. 1 during operation thereof.

Referring to FIG. 3, the line voltage referred to at 200 is shown as a conventional 60 cycle sine wave wherein the tubes 10 and 10' and the tubes 72 and 73 are so connected that they will fire only during the positive portion of the cycle. The oscillators 105 and 106 produce an output which is illustrated by the waveform 202 for one oscillator and 202' for the other one, having a frequency of approximately 10 kilocycles for the duration of a control signal, which applies these 10 kilocycle pulses which are in the order of 10 kilovolts amplitude to the aquadag rings 52 and 52' while the line voltage is positive.

Figure 4:
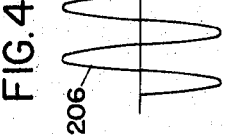
FIG. 4 is a magnified illustration of the waveform of the pulses required to fire a tube according to the present invention.

The incoming signals, where are 180° out of phase are clipped and differentiated by the pulse shapers 75 and 79 to be of a duration of approximately 200 microseconds during alternate half cycles of line voltage. Thus, in response to a pulse applied to the transistors 87 and 103 during these alternate half cycles, the output of each oscillator provide 2 pulses of approximately 100 microseconds in width and 10 kilovolts of amplitude during alternate half cycles for firing the tubes 10 and 10'. The pair of pulses which occur on wires 60 and 60' during alternate half cycles are referred to at 206 of FIG. 4 in extremely magnified form.

In summary, the control signal pulses applied to the shaper terminals 70 and 71 are so phased that conduction will occur in tubes 72 and 73 when their respective anodes are positive. The power output of tubes 72 and 73 is controlled by the degree of phase delay of the incoming signals to 70 and 71 in reference to the power supply 81. It has been found that pulses of shorter duration than 100 microseconds applied to the aquadag rings 52 and 52' do not cause the tubes 10 and 10' respectively to fire since ionization time of the mercury of the pools 28 and 28' is approximately 100 microseconds. It has been found that a pulse wider than 100 microseconds only increases the duty cycle and adds nothing to the excellent starting stability already inherent with a system according to this invention. However, greater reliability is provided to the system by applying a pair of pulses each of which is approximately 100 microseconds in width for firing the tubes 10 and 10' respectively. This insures that in the event a full initial pulse is not received the subsequent pulse will fire the tube.

Thus, I have provided an improved capacitron type tube and a method and system for operating it, whereby the tube will operate indefinitely without "wetting" and may be constructed of relatively inexpensive materials without the necessity of complicated treatment in its fabrication.

Moreover, the improved tube, and method and system for firing it possesses all the advantages of the previous methods without any of the inherent disadvantages. With the benefit of the present invention, the system can have rapid starting, requiring no time delay due to thermionic emission, and the power consumption for operation is in the order of five watts as compared to a required power of ten times that much for other systems. This low power consumption helps maintain reasonable ambient temperatures in locations where a multiplicity of apparatus, such as welding equipment, are operated in close proximity to each other. Moreover, temperature compensating circuitry for solid state devices may be extremely simplified.

Although, a resistance welding circuit using ignitrons is shown to illustrate the principles of the invention, it is understood that it may be used in any organization requiring the switching of unlimited current capacity. For example, in one application, the invention was used to discharge capacitor banks, which were capable of releasing 1000 amperes of instantaneous current. In actual tests a system according to the present invention discharged these capacitor banks for in excess of a quarter of a million times at a rate of eight discharges a minute with no discernable adverse effects.

Having described an improved mercury pool tube of the capacitron type and a system and method for operating the same according to one specific embodiment, it is understood that other forms and adaptations may be made without departing from the spirit or scope of the invention.

What I claim is:

1. In combination, a field emission rectifier tube having a mercury pool cathode and an anode and a firing band positioned around the outside of the tube envelope to fire the tube upon the application of a high voltage thereto, circuit means including a source of alternating voltage electrically connected operatively to the cathode and anode of said tube to render the anode positive with respect to the cathode during alternate half cycles thereof, circuit means for producing at its output voltage pulses of sufficient amplitude to fire the tube when applied to the firing band during each said alternate half cycles, said pulses having a frequency of ten kilicoycles, and circuit means operative to apply effectively the output voltage of the oscillating means to the firing band for a duration not exceeding two hundred microseconds during each said alternate half cycle.

2. A combination according to claim 1 wherein the firing band is an annular coating of a colloidal suspension adhering in its dried state to the exterior of the tube envelope.

3. A system for causing the conduction of high currents between a mercury pool cathode and the anode of a filed emission rectifier tube having a firing band positioned in intimate contact with the outside of the tube envelope opposite the surface of the mercury pool, said system comprising circuit means including a source of A.C. voltage operative to render the anode more positive than the cathode during alternate half cycles, and means operative to apply to the firing band during said alternate half cycles less than three distinct voltage pulses, each of which has a duration in the order of one hundred microseconds and an amplitude sufficient to cause conduction between the cathode and anode, whereby the application of the voltage to the firing band does not wet the inside of the envelope with mercury.

4. A system according to claim 3 wherein the means for applying the voltage pulses to the firing band is operative to apply a pair of pulses, each of which is in the order of one hundred microseconds in duration.

5. A method of causing conduction between a mercury pool cathode and the anode of a tube of the capacitron type, comprising applying a high voltage pulse of positive potential and in the order of 100 microseconds around and to the outside of the glass envelope when the anode is positive with respect to the cathode.

6. A method of firing a field emission rectifier tube having an anode and a mercury pool cathode and a starting band in intimate contact with the exterior of the tube envelope opposite the surface of the mercury pool, comprising biasing the anode and cathode so that the cathode is more negative than the anode, applying to the starting band a voltage pulse of proper polarity and amplitude sufficient to ionize the mercury vapor in the tube, and limiting the duration of the applied pulse to in the order of one hundred microseconds.

7. A method according to claim 6 wherein the starting band is a carbon compound coating on the exterior of the tube.

8. A method of firing a field emission rectifier tube having an anode and a mercury pool cathode in a glass envelope of substantially uniform thickness and a starting band comprised of a carbon coating in intimate contact with the exterior surface of the glass envelope opposite the surface of the mercury pool, comprising biasing the anode and cathode so that the cathode is more negative than the anode, applying to the starting band a voltage pulse of proper polarity and amplitude sufficient to ionize the mercury vapor in the tube, and limiting the duration of the applied pulse to in the order of one hundred microseconds.

9. A method of firing a field emission rectifier tube during a plurality of alternate half cycles of an A.C. voltage wherein the tube has an anode and a mercury pool cathode and a starting band in intimate contact with the exterior of the tube envelope opposite the surface of the mercury pool and the anode and cathode are connected to the A.C. voltage so that the cathode is biased negative with respect to the anode during alternate half cycles of the A.C. voltage, comprising applying to the starting band less than three distinct voltage pulses of proper polarity and amplitude to ionize the mercury vapor in the tube during each of said alternate half cycles, and limiting the duration of each of the said pulses to in the order of one hundred microseconds.

10. A method according to claim 9 wherein the starting band is a carbon compound coating.

11. In a discharge tube having a mercury pool cathode and an anode enclosed in a generally cylindrical glass envelope so that the anode is spaced above the surface of the mercury pool and having means extending sealingly through opposite ends of the glass envelope for connecting the anode and the cathode to an external source of energy, the combination of an annular coating of a current conducting material in intimate contact with the exterior surface of the glass envelope opposite the top surface of the mercury pool, and a metallic conductor fastened to a portion of the annular coating and positioned to have the annular coating conduct to apply a firing voltage to the exterior surface of the glass envelope opposite the surface of the mercury pool when the metallic conductor is connected to an energy source.

12. In a tube according to claim 11 wherein the annular coating is a carbon compound.

13. A discharge tube, comprising a unitary generally cylindrical glass envelope sealed at opposite ends, an anode mounted in the envelope having means extending through one end for connection to an external source of energy, a mercury pool cathode contained by the glass envelope, means extending sealingly through the glass envelope at the opposite end and immersed by the mercury pool for connecting the pool to an external source of energy, an annular coating of current conducting material in intimate contact with the exterior surface of the glass envelope surrounding the glass envelope opposite the surface of the mercury pool to conduct energy for firing the tube, said annular coating being positioned to extend above and below the surface of the pool, an enclosure sealing hermetically the tube envelope including a plastic sleeve positioned surrounding the envelope and having a hole therein positioned to register with a portion of the annular coating and a pair of metallic caps enclosing opposite ends of the plastic sleeve and being sealingly connected to the exterior anode and cathode connecting means, and a metallic conductor sealingly inserted into the hole of the plastic sleeve to be in electrical contact with the annular coating for applying a voltage to the annular coating when the metallic conductor is connected to an external source of energy.

14. A tube according to claim 13 including a coating of a dielectric compound interposed between the exterior surface of the glass envelope and the inner surface of the plastic sleeve.

15. A tube according to claim 13 including a metallic tab attached at one surface to the annular coating positioned to have a portion in registry with the hole in the plastic sleeve and attached at its opposite surface to the metallic conductor.

16. A tube according to claim 13 wherein the annular coating is a carbon compound.

17. A tube according to claim 13 wherein the cylindrical glass envelope is of substantially uniform thickness.

References Cited by the Examiner

UNITED STATES PATENTS

| | | | |
|---|---|---|---|
| 2,072,979 | 3/1937 | Cordes | 313—47 X |
| 2,438,139 | 3/1948 | Arnott | 313—166 |
| 2,824,254 | 2/1958 | White | 315—166 X |
| 3,049,639 | 8/1962 | Reiling et al. | 313—166 |

FOREIGN PATENTS 258,220　2/1927　Great Britain.

DAVID J. GALVIN, *Primary Examiner.*

RALPH G. NILSON, *Examiner.*

C. R. CAMPBELL, *Assistant Examiner.*